(12) United States Patent
Mott et al.

(10) Patent No.: US 9,649,803 B2
(45) Date of Patent: May 16, 2017

(54) SHEATH FLOW METHODS

(71) Applicant: The United States of America, as represented by the Secretary of the Navy, Washington, DC (US)

(72) Inventors: David R. Mott, Burke, VA (US); Peter B. Howell, Jr., Gaithersburg, MD (US); Frances S. Ligler, Fuquay Varina, NC (US); Stephanie Fertig, Springfield, VA (US); Aron Bobrowski, Miami, FL (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 110 days.

(21) Appl. No.: 14/725,769

(22) Filed: May 29, 2015

(65) Prior Publication Data

US 2015/0266226 A1 Sep. 24, 2015

Related U.S. Application Data

(62) Division of application No. 12/987,251, filed on Jan. 10, 2011, now Pat. No. 9,067,204, which is a division
(Continued)

(51) Int. Cl.
*G01N 1/10* (2006.01)
*B01L 3/00* (2006.01)
*B29C 47/06* (2006.01)

(52) U.S. Cl.
CPC .................. *B29C 47/065* (2013.01)

(58) Field of Classification Search
CPC ....... B01L 3/502746; B01L 2400/0487; B01L 2400/084; B01L 3/502776; B01L 3/5027; B01L 3/502707; B01L 2200/0636; B01L 2300/0816; B01L 2300/0883; B01L 2200/0652; B01L 2200/0668; B01L 2300/0636; B01L 2300/0877; B01L 2400/0415; B01L 2400/086; B01L 3/502761; B01L 3/502784; G02B 6/10; B01D 15/3842; G01N 30/34; G01N 33/54373; G01N 2201/024; B01J 2219/0086; B01J 2219/00889; B01F 13/0818; B01F 7/00908
(Continued)

(56) References Cited

U.S. PATENT DOCUMENTS

2003/0051760 A1* 3/2003 Johnson et al. .............. 137/896

* cited by examiner

*Primary Examiner* — Dean Kwak
(74) *Attorney, Agent, or Firm* — US Naval Research Laboratory; Roy Roberts

(57) ABSTRACT

A sheath flow system having a channel with at least one fluid transporting structure located in the top and bottom surfaces situated so as to transport the sheath fluid laterally across the channel to provide sheath fluid fully surrounding the core solution. At the point of introduction into the channel, the sheath fluid and core solutions flow side by side within the channel or the core solution may be bounded on either side by the sheath fluid. The system is functional over a broad channel size range and with liquids of high or low viscosity. The design can be readily incorporated into microfluidic chips without the need for special manufacturing protocols. Uses include extruding materials and/or fabricating structures.

3 Claims, 16 Drawing Sheets

Related U.S. Application Data of application No. 11/423,225, filed on Jun. 9, 2006, now Pat. No. 8,361,413.

(60) Provisional application No. 60/690,057, filed on Jun. 9, 2005.

(58) Field of Classification Search
USPC .................................. 422/500–504; 436/180
See application file for complete search history.

SHEATH FLOW METHODS

CROSS-REFERENCE TO RELATED APPLICATIONS

This application claims benefit under 35 U.S.C. §§120 and 121 of U.S. application Ser. No. 12/987,251 filed on Jan. 10, 2011 which claims the benefit under 35 U.S.C. §§120 and 121 of U.S. application Ser. No. 11/423,225 filed on Jun. 9, 2006, which claims the benefit under 35 USC §119(e)) of U.S. Application No. 60/690,057 filed on Jun. 9, 2005. The entirety of each of these applications is incorporated herein by reference.

BACKGROUND OF THE INVENTION

Sheath flow is a widely used technique for a variety of applications, including but not limited to particle counting, flow cytometry, waveguiding, and fluid control. Sheath flow involves surrounding a central flow stream (the core) with a surrounding stream (the sheath). In particle counting and flow cytometry applications, the sheath prevents particles in the core from coming into contact with the walls of the channel, thus preventing adhesion and clogging. The sheath also serves to focus the particles or molecules into the center of the channel, allowing for easy counting or measurement through optical or other means. Sheath flow can also be used with fluids of different refractive index to create a waveguide in the core or sheath stream in order to measure transfer of analytes from one stream to the other or to control the rate of interaction between molecules in one or both streams for carefully controlled chemistry or analysis.

Previous designs have created sheath flow through an annular arrangement. A small nozzle was positioned inside a larger tube. The core solution was pumped through the nozzle and the sheath solution was pumped through the larger tube. This configuration required careful alignment of the two tubes and did not easily lend itself to miniaturization. Since the diameter of the nozzle was fixed, the relative sizes of the core stream and sheath solution were relatively constant within a set range.

Other devices provide sheath flow on a chip, but the flow typically operates only in two dimensions. The core stream in these devices is bordered on either side by the sheath streams, however the core is not sheathed top and bottom. The complexity of the support plumbing for these devices is increased, as the number of flow streams is increased from two to three as compared to the annular arrangement design. It is possible to sheath the stream on the top and bottom of the core stream in these systems by adding two additional inlet ports in the top and bottom of the channel. However, this greatly increases the manufacturing complexity of the device. Micromachining technologies are inherently two-dimensional. Three-dimensional channel paths can be created by stacking several two dimensional designs on top of one another, but this adds to the complexity and difficulty of the manufacturing process. Creating a fully sheathed flow in this way could require at least several individual levels, which must be independently produced and then carefully aligned. In addition, use of the device could require multiple pumps to provide solutions to all the inlets.

Flow cytometry is a common technique used to count and evaluate cells and other particles in suspension. In traditional flow cytometers, the sample solution exits a small tube into the center of a larger tube, carrying clean solution. The larger tube is then constricted so that both streams are reduced in diameter and accelerate. The sample stream is reduced in diameter to roughly the size of the cells to be analyzed. This forces the cells to travel in single file, along a fixed and highly precise trajectory within the flow channel. Because the cells are positioned so reproducibly, high numerical aperture optics can be precisely aligned to interrogate them. Alternatively, electronic methods, such as capacitance or impedance changes, could be used for interrogation. Also, because the cells are all following the same path down the channel, they all have the same velocity. This allows the duration and intensity of signals to be correlated with individual cells and particles.

Because of the success of bench-top cytometers, there have been several attempts to create a miniaturized flow cytometer. The laminar flow found in most microfluidic systems makes them at least theoretically well suited to flow cytometry. In practice, however, emulating the annular design of the traditional cytometers is a difficult fabrication problem.

Some flow cytometers operate by simply filling the whole channel with the sample stream. Optical detection can be problematic in these systems because the cells are evenly distributed in the channel. Reducing the dimensions of the channel makes it easier to focus the optics tightly onto the cells, but also increases the risk of clogging. Light scatter off the walls of the channel is also a problem with these systems. Another flow cytometer operates by confining the flow top and bottom between two hydrophobic PDMS layers, and on the sides by air. A variety of factors effect the size of the "channel," including the hydrostatic pressure and surface tension of the fluid. This system also suffers from the light scattering issues of the previous designs. In addition any contamination of the PDMS surface will change the containment of the solution and may ultimately cause it to fail.

Another flow cytometer system approximates an annular design by focusing the sample stream in one dimension. The sample stream was passed through one arm of a cross intersection while sheath streams are introduced through the two perpendicular arms to laterally constrict the sample stream to the center of the channel. The sample is only confined on the sides, therefore the cells come in contact with the top and bottom of the channel, creating the risk of fouling, and often necessitating the addition of a dynamic coating such as bovine serum albumen, hydroxylpropylmethyl cellulose, or covalent coatings such as trichlorohexadecylsilane. Also, the fact that the cells are distributed vertically means that the optics must have a relatively low numerical aperture, which decreases the amount of light that can be gathered from a single cell and reduces the spatial resolution of the measurements.

Other flow cytometer systems attempt to sheath the sample stream both horizontally and vertically, typically by adding an additional two channels to sheath the stream vertically as well as horizontally. From the standpoint of cytometry, this is a far better situation, because the sample is now completely isolated from the channel walls, and the position of the particles to be analyzed is fixed. Unfortunately, the addition of another set of sheath inputs brings the total number to four. Their relative flow rates must be carefully controlled or the position of the sample stream will drift and the particles will no longer pass through the aligned interrogation region. The best way to ensure even distribution of flow among all the sheath channels is to have a separate pump supplying each stream, but this substantially increases the expense and complexity of the supporting fluidics.

Therefore there is a need in the art for a method and device of providing a sheath flow that fully surrounds the core, can be varied in size, and is easy to manufacture and use for a wide variety of applications.

BRIEF SUMMARY OF THE INVENTION

Streams in microfluidic systems with low Reynolds numbers operate in the laminar flow regime, e.g. there is no turbulent mixing or transport of solutes between the streams other than occurs through diffusion. Provided is a sheath flow method and device comprising a channel having at least one groove in the top and bottom of the channel. Core fluid is introduced into one side of the channel, while sheath fluid is introduced on the other side. The grooves or ridges cause sheath fluid to flow from one side of the channel entirely around the core fluid to the other side of the channel. Thus the core fluid introduced into one side is entirely encircled by sheath fluid introduced into the other side.

DETAILED DESCRIPTION OF THE INVENTION

In the present device and method, the core stream and one or more sheath streams are introduced into a single channel. One or more fluid transporting structures located at the top and bottom of the channel direct the sheath fluid around the core stream, separating the core stream from the walls of the channel. Once the position of the core stream is established in the interior of the channel, it remains in that position due to laminar flow.

Figure 1:
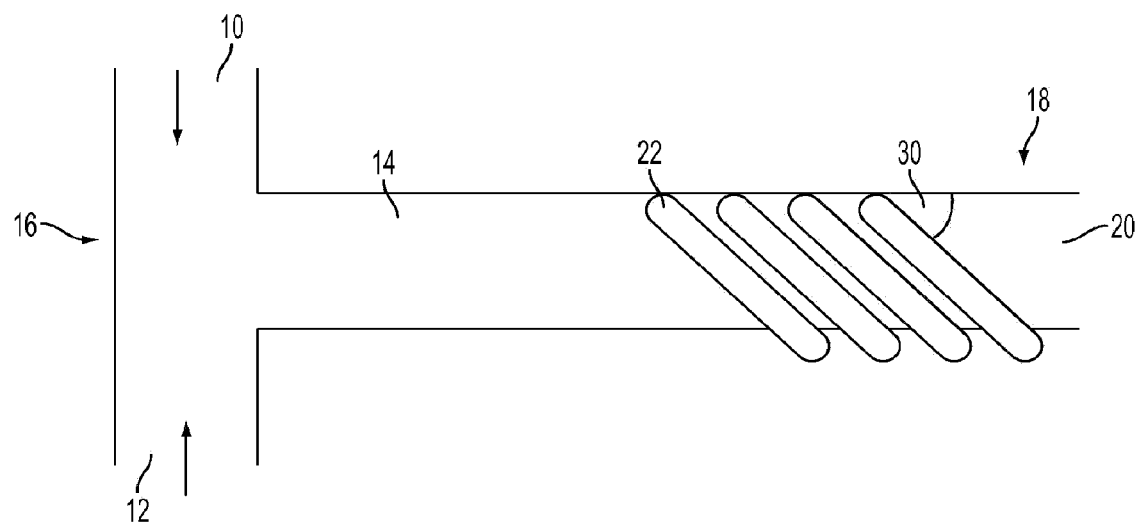
FIG. 1 is a view of one example of a sheath flow device.

FIG. 1 shows a top view of one example of a sheath flow device. A sheath stream inlet 10, and a core stream inlet 12, allow a sheath stream and a core stream to be introduced into a channel 14. One design provides for a at a 'T' intersection at the proximal end 16 of the channel 14. The sheath stream and the core stream flow down the channel side-by-side towards the distal end of the channel 18 where an outlet 20 is present. At least one fluid transporting structure 22 such as a groove or a ridge is located in the channel 14 between the inlets 10, 12 and the outlet 20. The fluid transporting structure 22 transports the sheath stream across the top and bottom of the channel 14 to completely surround the core stream. The fluid transporting structure 22 crosses the channel 14 at an angle 30.

The device can be readily fabricated using a variety of techniques, including molding, milling, laser ablation, soft lithography techniques and other fabrication techniques known to those skilled in the art. Any material that can be machined or molded into the appropriate shapes can be used. The current techniques used in the mass production of microfluidic components can be easily adapted to the production of this sheath flow design.

Figure 2:
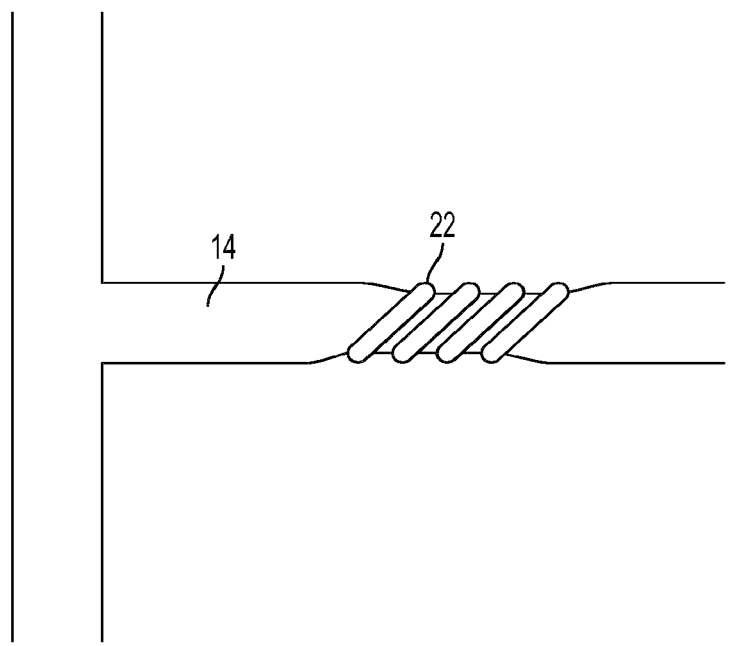
FIG. 2 is a view of one example of a sheath flow device.

The exact shape of the channel is not critical. For example, FIG. 2 shows a channel 14 with a constriction at the location of the grooves 22. The constricted device showed similar behavior to devices without the constriction. The size of the channel can be varied within a broad range of size scales. The size of the channel is limited at the lower end by diffusion. When the width or diameter of the channel reaches the diffusional distance of the molecules or particles of interest, any attempts to confine them to a specific region of the channel will be thwarted.

The upper limit for the channel width is set by the Reynolds number of the system. The device shown in FIG. 1 has been shown to function at Reynolds numbers up to and including 200. This means that the device can be fabricated into larger sizes using slower velocities or higher viscosity fluids. Sheath flow devices have been fabricated for use with high viscosity fluids that are 3 mm in width that have Reynolds numbers of 0.0008, so the actual channel diameter can be significantly wider than that with the use of appropriate fluids. The device will operate at Reynolds numbers up to those at which turbulence is initiated.

The channel has at least two inlets at or near its proximal end. The inlets are used to introduce a sheath stream and a core stream into the channel. The size and exact location of the inlets are not important, provided that the fluid transporting structure in the channel is located downstream from the inlets.

The at least one fluid transporting structure is typically a groove or a ridge located inside the channel. The structure transports the sheath stream laterally across the channel and around the core stream, separating the core stream from the walls of the channel. Once the position of the core stream is established in the interior of the channel, it remains in that position due to laminar flow. The angle of the fluid transporting structure across the channel is not critical to the design. FIG. 1 shows a device having a fluid transporting structure 22 that has an angle 30 that is about 45° relative to the channel; however, other oblique angles will work as well.

The number and depth of the fluid transporting structures are design parameters that also can be adjusted to suit particular applications. A single structure located on the top and bottom of the channel will provide for a full sheath around the core stream. The grooves do not have to be aligned in order for the device and method to operate.

Figure 19A:
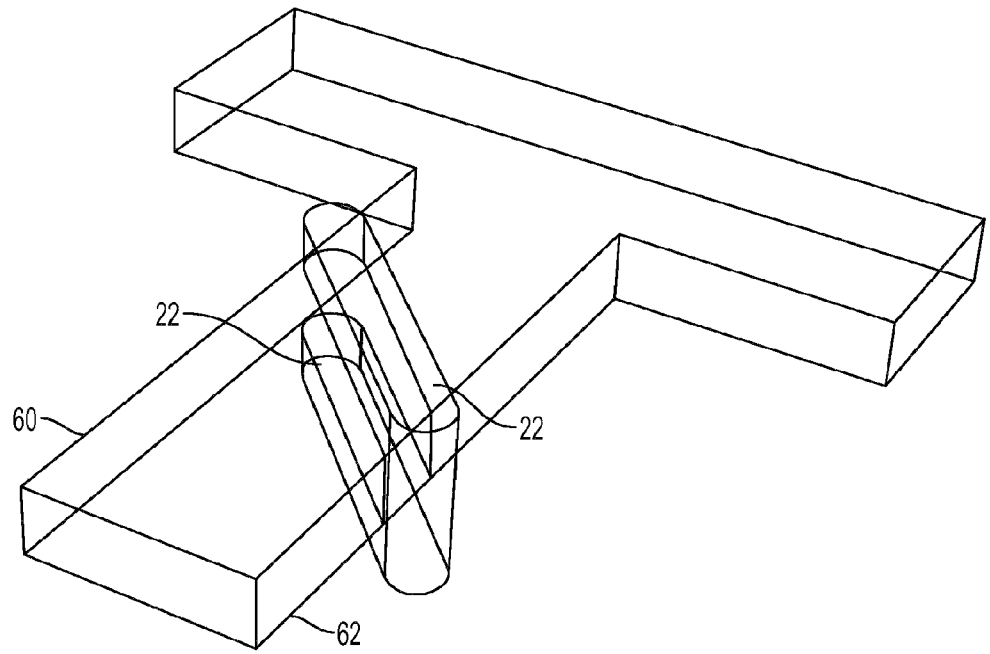
FIG. 19a is view of one example of a sheath flow device showing fluid transporting structure across the top surface and a second fluid transporting structure across the bottom surface.
Figure 19B:
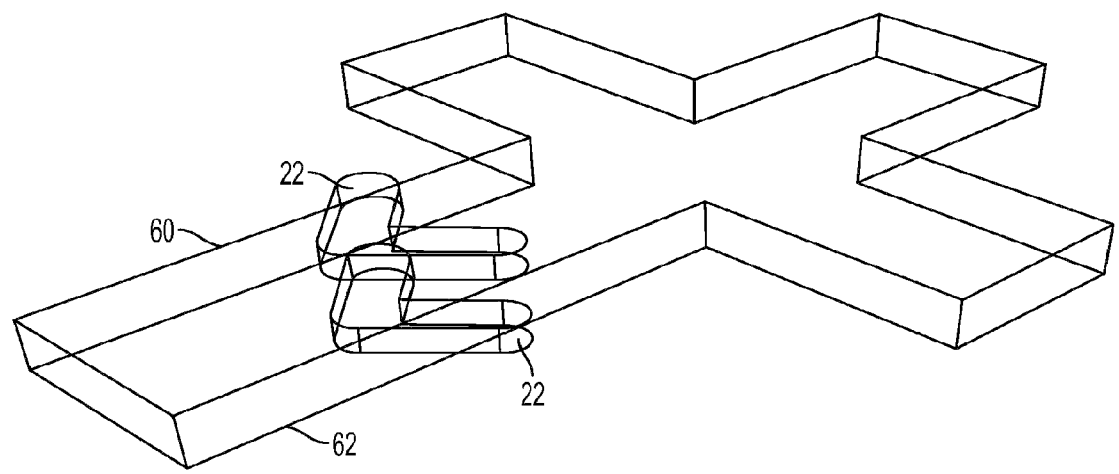
FIG. 19b is view of one example of a sheath flow device showing fluid transporting structure across the top surface and a second fluid transporting structure across the bottom surface.

Increasing the number of fluid transporting structures provides control over the lateral position of the core within the channel. Increasing the size of the fluid transporting structures correlates with a more effective transport of the sheath stream across the channel. Preferably, the fluid transporting structures penetrate the wall of the channel on the downstream end. FIG. 1 shows the fluid transporting structures 22 penetrating the wall of the channel 14 on the downstream end. This penetration increases the effectiveness of the fluid transport to better encase the core stream in the sheath stream. Sheathing will occur, however, even if the fluid transporting structure does not penetrate the channel wall. FIGS. 19a and 19b show a two embodiments of the present sheath flow device having a first fluid transporting structure 22 located across a top surface 60 of a channel and a second fluid transporting structure 22 located across a bottom surface 62 of a channel.

Example

Figure 3A:
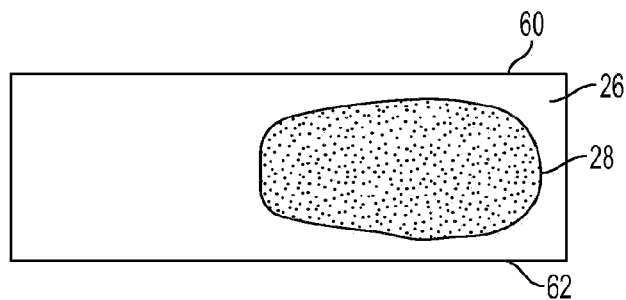
FIGS. 3(a) through 3(f) show the cross-sections resulting from a sheath flow device having 1 pair of grooves through 6 pairs of grooves, respectively.
Figure 3B:
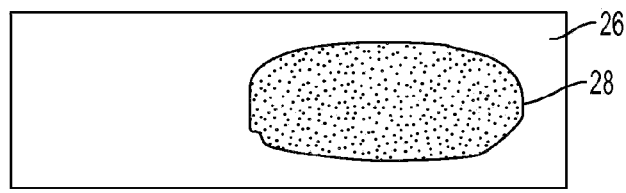
Figure 3C:
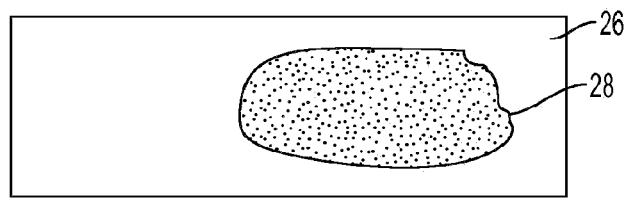
Figure 3D:
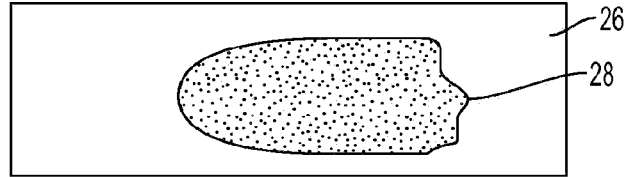
Figure 3E:
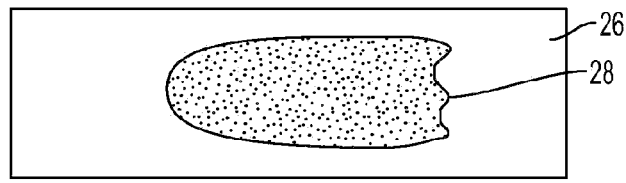
Figure 3F:
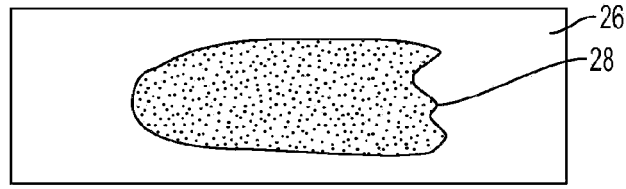

The number of grooves can be used to control the position of the core within the channel. FIGS. 3(a) through 3(f) show the cross-sections resulting from a sheath flow device having 1 pair of grooves through 6 pairs of grooves, respectively. One pair of grooves is sufficient to completely surround the core stream 28 with sheath stream 26. FIG. 3(a) illustrates the top surface 60 of the channel and the bottom surface 62 of the channel. Subsequent pairs carried more sheath fluid to the right, causing the core to be shifted leftward. Having four pairs of grooves appears to be sufficient to place the core roughly in the center of the channel. Depending on the relative flow rates of the two fluids, the core can be made as small as 1% of the total channel cross-section. It is also possible to make the core quite large without losing the sheathing effect.

Figure 4:
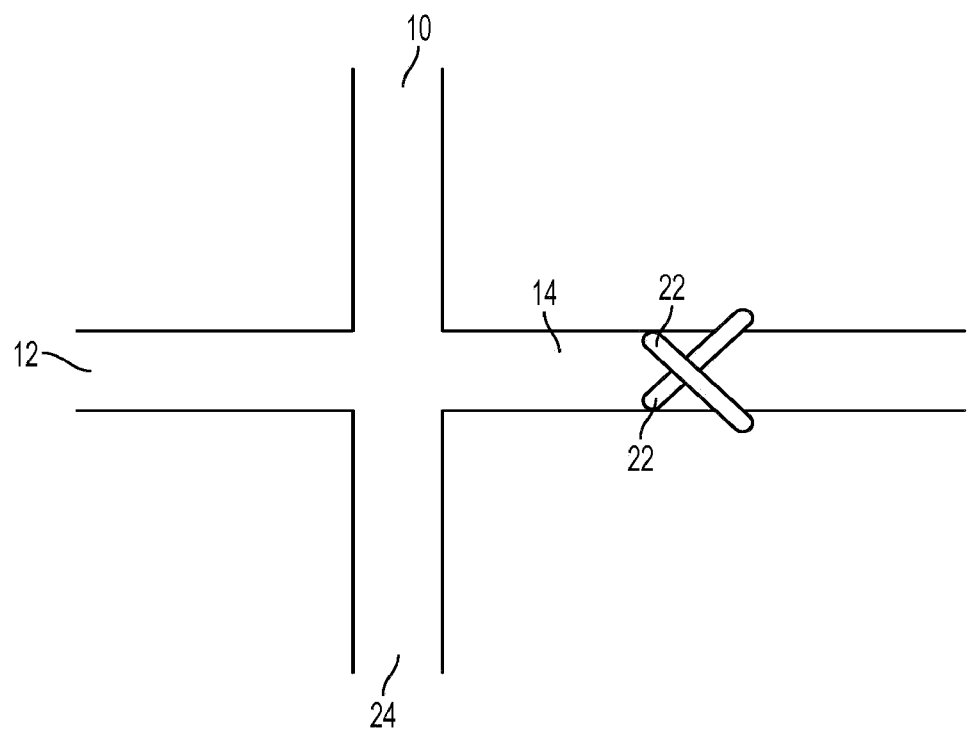
FIG. 4 is a view of one example of a sheath flow device.

The fluid transporting structures may also be used in a cross configuration when sheath solution is provided from both sides by a third inlet. FIG. 4 shows a channel, 14, having a first sheath stream inlet 10 and a second sheath stream inlet 24. The core stream inlet 12 is located between the first and second sheath stream inlets. A first groove 22 located in the top of the channel moves sheath stream from the left of the channel across the top. An opposing groove 22 located at the bottom the channel in a cross configuration with the first groove moves solution from the right of the channel across the bottom. This design has the advantage that the centroid of the core remains stationary, even when the relative flow rate of the core solution is varied. Additionally, the first and second sheath stream inlets allow differing sheathing materials to be introduced into the channel.

Figure 5:
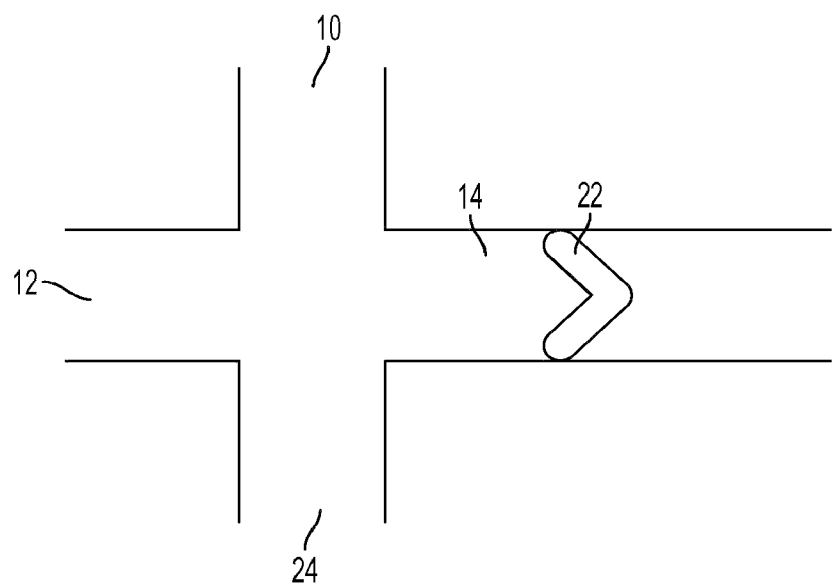
FIG. 5 is a view of one example of a sheath flow device.

Further, the fluid transporting structures located on the top and bottom of the channel may be configured in a shape that crosses the channel having a central area that is distal to its ends, as show in FIG. 5. The fluid transporting structure 22 of FIG. 4 is shown as a "v" shape, however, any shape having a central area that is located distally in the channel to its ends would work, such as a semi-circle. FIG. 4 shows a channel, 14, having a first sheath stream inlet 10 and a second sheath stream inlet 24. The core stream inlet 12 is located between the first and second sheath stream inlets. Fluid transporting structures 22 located in the top of the channel moves sheath stream across the core stream to sheathe the core stream.

Example

A microfluidic chip was made using a Techno-isel CNC milling router (Techno Inc., New Hyde Park, N.Y.) in poly(methylmethacrylate) (PMMA) (Plexiglas G, Atofina Chemical Inc., Philadelphia, Pa.) via a method described by Howell, et al, Lab on a Chip 2005, 5, 524-530, Howell, et al, Lab on a Chip 2004, 4, 663-669, and Mott, et al, Lab on a Chip 2006, 6, 540-549, all incorporated in full herein by reference. The main channel was 3.18 mm wide by 1.02 mm deep. The grooves were 0.794 mm wide by 0.51 mm deep, and placed in pairs on both the top and bottom of the channel. A 70% fructose solution was used as core and the sheath solutions to ensure that the flow within the channel stayed in the Stokes regime. The sheath stream was labeled with fluorescent dye (Rhodamine W T, Bright Dyes, Miamisburg, Ohio). Channel cross-sections downstream of the grooves were obtained via a method described previously by Howell, P. B. et al, Lab on a Chip 2005, 5, 524-530 and Mott, et al, Lab on a Chip 2006, 6, 540-549, both incorporated in full herein by reference.

Figure 6:
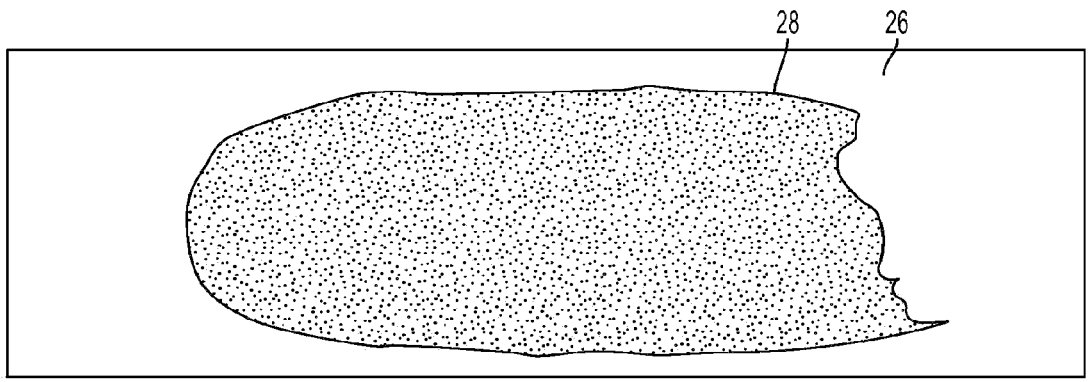
FIG. 6 is a representative cross section of sheathed flow.
Figure 7:
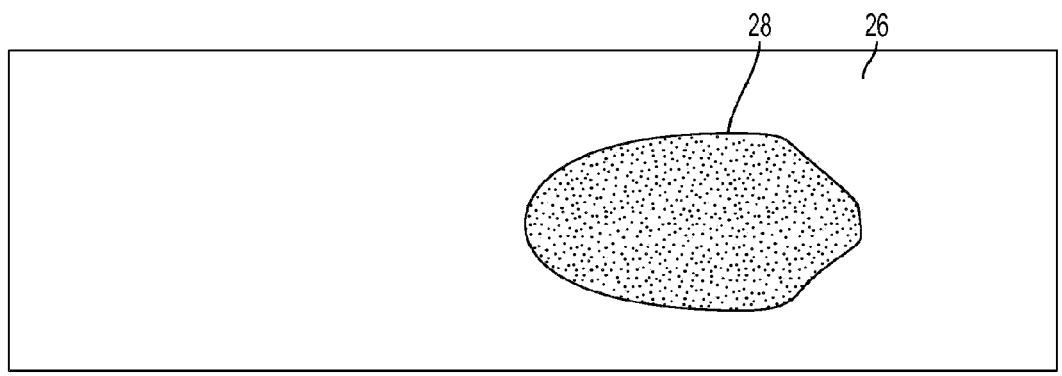
FIG. 7 is a representative cross section of sheathed flow.

The relative flow rate of the two streams can be widely varied without compromising the integrity of the sheath. FIG. 6 demonstrates a core-to-sheath ratio of 4:1. While the volumetric flow rate of the sheath stream 26 constitutes just 20% of the channel, it still completely surrounds the core stream 28. FIG. 7 demonstrates that a core-to-sheath ratio of 1:4. While the core stream 28 has been reduced to 20% of the net flow compared to the sheath stream 26, it is still clearly defined. For the specific device and method used in the example, a stable, fully enveloped sheath flow for Reynolds numbers of up to approximately 200 was generated before the limits of the pump were reached.

Figure 8:
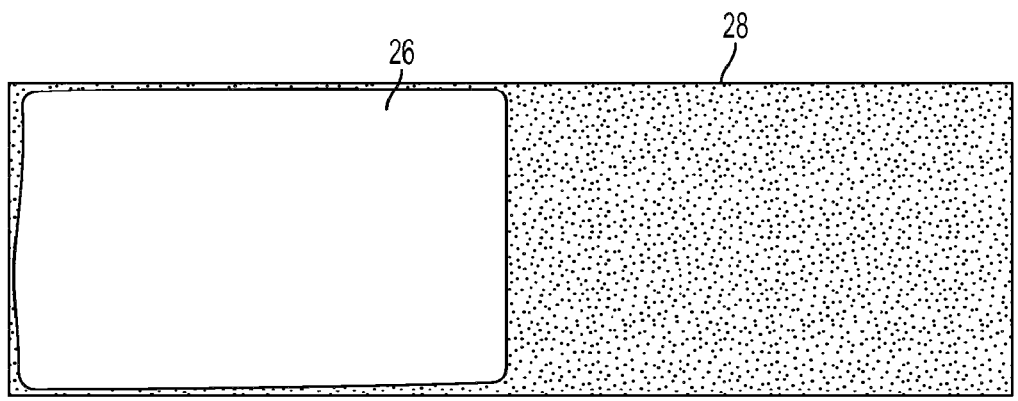
FIG. 8 is a representative cross section of sheathed flow.
Figure 9:
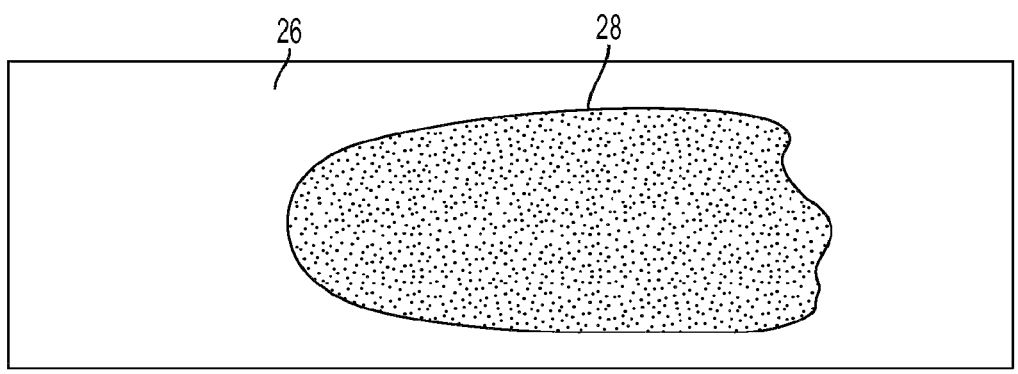
FIG. 9 is a representative cross section of sheathed flow.
Figure 10:
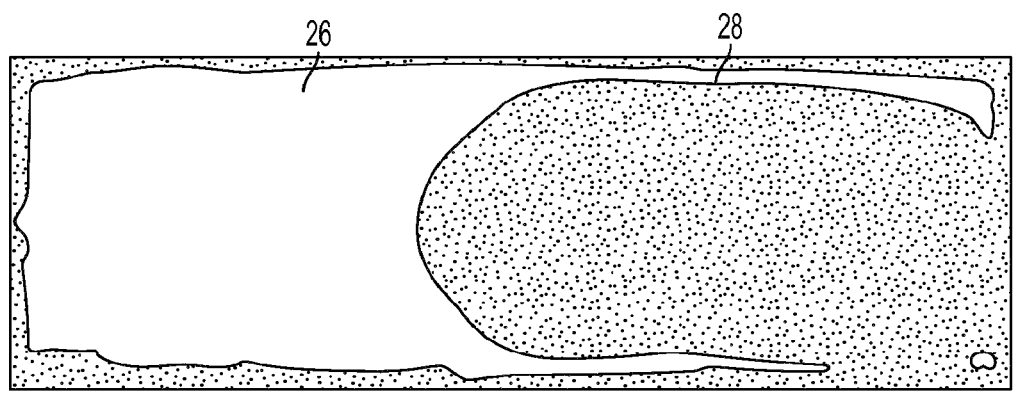
FIG. 10 is a representative cross section of unsheathed flow.

FIG. 8 shows a typical cross-section of the channel before sheathing. Sheath stream 26 and core stream 28 are side by side in the channel. FIG. 9 shows the sheath stream 26 surrounding the core stream after passing the fluid transporting structures, not shown. Fluorescent dye can be added to either the sheath stream or the core stream to provide contrast. Unlike other sheath flow systems, this device has also been shown to be reversible. It is possible to unsheathe a sheathed flow to recapture both the core and the sheath with high efficiency. Unsheathing is achieved by providing a second fluid transporting structure located proximally in the channel from the first fluid transporting structure. The second fluid transporting structure is arranged with a reversal of direction as compared to the first fluid transporting structure. The second fluid transporting structure does not have to be arranged to be the exact reverse of the first fluid transporting structure, however, the orientation is in the opposite direction from the first. The ability to unsheathe a sheathed flow can be useful in systems where the sheath solution is in limited supply and the capability of recycling the flow is advantageous, such as continuous monitoring on a space station or other enclosed environment. It would also be useful where the solute or particles in the core solution were very precious and recapture is important. FIG. 10 shows the sheath stream 26 and the core stream 28 after unsheathing.

The diameters of the sheath and core can vary widely depending on the intended use of the device. FIGS. 8-10 show cross sections of a sheath flow system where the flow rate of the sheath stream is approximately the same as that of the core fluid and the sheath and the core have similar cross sectional areas. FIGS. 11 a-c show systems in which the relative flow rates of the core stream 28 and sheath stream 26 are adjusted so that the core diameter is very small compared to the sheath (<16 micron core compared to 3 millimeters sheath).

Using specific variations in the pattern of grooves, the exact location of the core stream can be also be moved across the channel. The capacity either to separate the walls of the channel from the core fluid using a minimum of sheath fluid or to focus the core fluid in a well defined region within the channel are significant advantages of the sheath flow device and method.

Figure 11A:
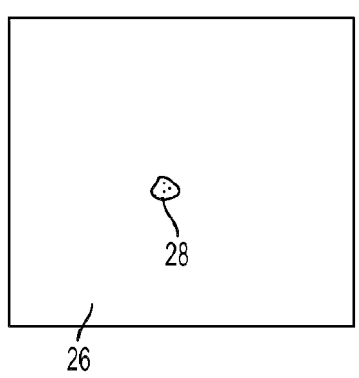
FIGS. 11 a-c show systems in which the relative flow rates of the core stream 28 and sheath stream 26 are adjusted so that the core diameter is very small compared to the sheath.
Figure 11B:
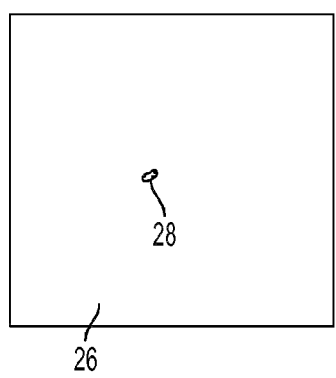
Figure 11C:
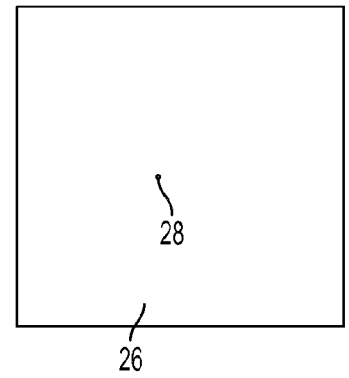

Furthermore, the relative flow rates of the core and sheath can be changed at will and the diameter of the core can be varied in real time if the application warrants, with no need to alter the device itself. As shown in the data in Table 1, the sheathing process remains unperturbed, even at sheath/core ratios over 40,000. FIG. 11a shows a core/sheath ratio of 2,100. FIG. 11b shows a core/sheath ratio of 21,000. FIG. 11c shows a core/sheath ratio of 42,000. Higher resolution microscopes would enable viewing of fluorescence from the core for even smaller core diameters.

TABLE 1

| Reynolds Number | Sheath Flow Rate | Sheath Diameter | Core Flow Rate | Core Diameter | | Ratio of Core/Sheath |
|---|---|---|---|---|---|---|
| | | | | Calculated | Measured | |
| 0.0008 | 21 mL/min | 3 mm | 10 µL/min | 45 microns | 75 microns | 2,100 |
| 0.0008 | 21 mL/min | 3 mm | 1 µL/min | 4.5 microns | 25 microns | 21,000 |
| 0.0016 | 42 mL/min | 3 mm | 1 µL/min | 3 microns | 16 microns | 42,000 |

The actual size of the core can be changed relative to the size of the channel by simply altering the relative flow rates of the core and sheath streams. Furthermore, this change can be effected in real time. Unlike nozzle system traditionally used for flow cytometry or extrusion, there is no need to go to smaller and smaller nozzles which may result in clogging problems, higher back pressures, and reduced output. In previous designs, the core solution must pass through a nozzle or other constriction to enter the flow. This presents a potential clogging point, for the solution containing the cells or other particles to be analyzed. Under the present design, channels can be of uniform size to avoid constrictions and potential clogging points.

Using the device and method described herein, microdialysis could be accomplished without a membrane. The core stream is recaptured after it is exposed by sheathing to the sheath stream. This exposure provides for the removal of low molecular weight molecules by diffusion across the interface of the core stream and the sheath stream. The ability to conduct microdialysis without a membrane prolongs the life of the system. Current microdialysis systems operate for limited lifetimes due to the potential for membrane clogging. Additionally, separations based on differential solubility as well as differential size can be provided by the device and method described herein. For example, a whole blood sample could be sheathed into the center of the channel, and allowed to flow for sufficient distance for small molecules to diffuse outward from the core into the sheath. Cells and larger molecules such as proteins will not diffuse as quickly and will tend to stay in the core. The core would then be unsheathed and recovered, with the smaller molecules removed.

The device and method are useful as a means of protecting conduits, including but not limited to, pipes, tubes, ducts, tubing, capillaries, and microfluidic channels, from fouling or corrosion. A thin sheath stream of protective material is formed around the core stream. The sheath stream need not be the same viscosity as the core stream, therefore a relatively slow moving and thin protective sheath coating can be formed to protect the insides of conduits exposed to corrosive core stream solutions.

The device and methods described herein can also be used to reduce the power requirement for transporting viscous fluids in conduits, including but not limited to, ducts, pipes, tubes, tubing, capillaries, and microfluidic channels. Sheathing a viscous fluid in a second fluid of lower viscosity reduces the sheer stress at the conduit wall which lowers the pressure drop required to generate a given flow rate. The sheath flow component has been used to generate such a flow, in which a core and a sheath stream of differing viscosity initially enter the device side-by-side and the lower viscosity sheath stream sheaths the higher viscosity core stream.

The relatively low flow resistance of the device means that it can be used to sheath quite high-viscosity systems. This is useful in food and polymer extrusion applications.

The device and method is further useful in the synthesis of specialty polymeric filaments and tubes. Unlike standard extrusion technologies, filaments with continuously varying diameter can be created. Filaments made in this way can be expected to have increased elasticity over extruded filaments because of the native entropy of the polymer chains. The exact design may also be altered to change the cross-sectional shape of the resulting polymer strand. Since the extrusion device is small, inexpensive, and essentially operates as a passive component, many devices can be fabricated to perform in parallel, such as an array.

The device and methods described are also useful as liquid waveguides. Liquid waveguides have been described for monitoring chemical processes in which light is guided in fluid in a capillary or in the walls of a capillary in order to measure some component of the fluid. The device and method can be used for guiding the light in either the core stream or sheath stream for similar measurements, but with the capability for more exact focusing, much greater control of the relative dimensions of the light guiding fluid and the other fluid, and the avoidance of wall effects such as scattering of the light from the core by the capillary wall. The capability of guiding light in fluids is particularly useful in microfluidic systems.

Figure 12:
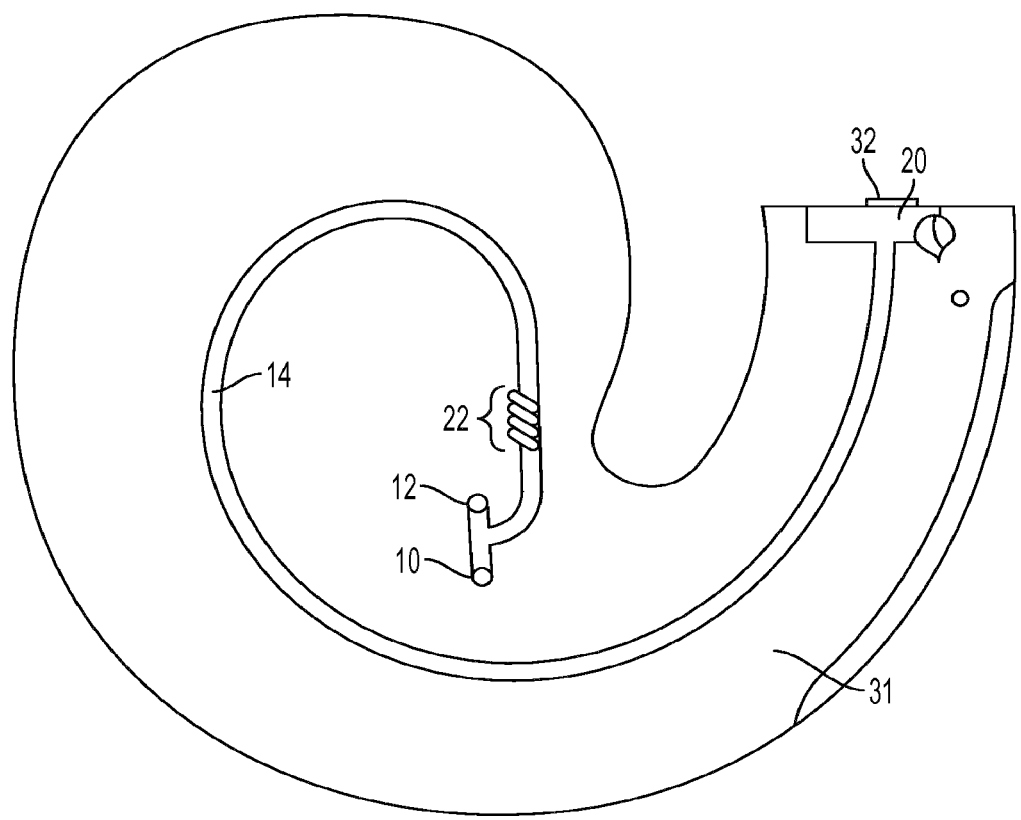
FIG. 12 is a liquid waveguide device.

FIG. 12 shows the waveguide application. A chip 31 was fabricated with a channel 14 beginning in the center and spiraling outward to the outlet 20 on the outside edge of the chip. A sheath stream inlet 10 and a core stream inlet 12, located near the center of the chip, are in fluid connection with the channel 14. The fluid transporting structures 22 sheathe the core stream within the sheath stream. The sheathed solution then travels outward in a spiral of 360 degrees before reaching the outlet 20. A light source 32 is introduced through a window (not shown) located at the outlet 20.

Core and sheath streams are introduced into the structure at the inlets. The core and sheath streams have approximately equivalent densities. The core stream is 70% fructose. The sheath stream is a saturated salt solution with enough fructose added to match the density of the core. There is a small amount of fluorescent dye in the sheath stream. The sheath was formed in the center of the chip 31 and then traveled outward along an increasing spiral.

Figure 13:
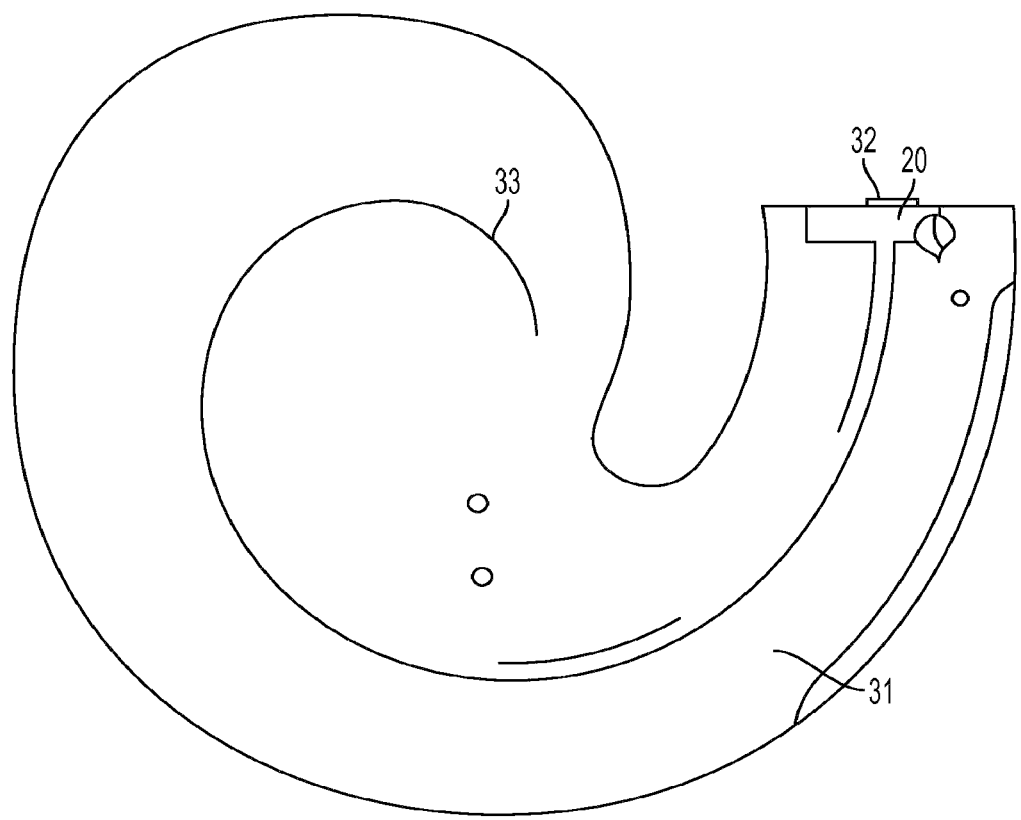
FIG. 13 is a representation of waveguided light though a liquid waveguide.

FIG. 13 shows the resulting waveguided light 33 when light was introduced to the channel from an outlet 20. The light is waveguided 33 through a full 360 degrees around the spiral. The light source 32 illuminates the higher refractive index stream, which in this case is the core; however, it could be either the sheath stream or the core stream.

Figure 14:
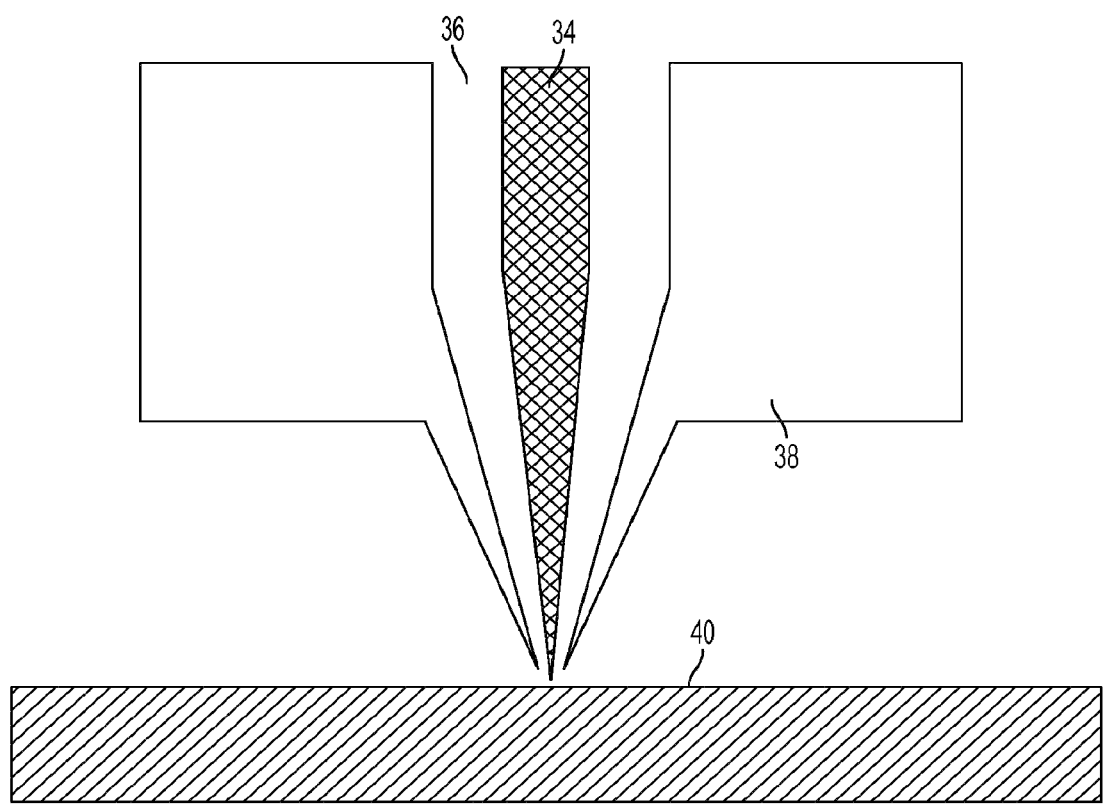
FIG. 14 is a near field microscope.

The condition for waveguiding is merely that the core stream and the sheath stream have different refractive indices. The ability to hydrodynamically focus a core down to submicron diameters allows for the production of a nearfield optical microscope probe entirely out of liquid. FIG. 14 shows an example of a nearfield optical microscope utilizing the present invention. Once the core stream 34 is ensheathed in the sheath stream 36, a tapered nozzle 38 is used to create the taper in the core. The high refractive index core stream 34 is directed through the nozzle 38. Light introduced into the core will be waveguided down to the surface 40. Reflected, scattered, or emitted light will then be collected by the waveguide and carried upward for detection. Another possible design may eliminate the need for a nozzle by introducing dielectrophoretic forces to push the core stream out into a fine tip. This design would also be able to use dielectric forces to steer the stream and raster it over the surface. Based on refractive index measurements of the chosen chemistry, the optimal geometry of the taper can be established. Because a solid tip does not have to be brought into close proximity with the surface, this design is well suited for the analysis of fragile biological samples. It is also well suited to perform liquid-phase photochemistry for nanomachining processes. The chip is able to raster over a surface using a translation stage.

The device and method of the present invention are useful in particle counting and flow cytometry. Flow cytometry has proven to be an effective tool for highly multiplexed screening of environmental samples in an automated format for continuous monitoring. Systems currently in use include the Luminex® flow cytometer, which is relatively large and requires a significant volume of water for sheath fluid—a primary factor limiting the time of continuous operation to one week. Furthermore, in case of a positive result, a separate aliquot of the sample must be analyzed for agent confirmation; thus all samples must be divided and temporarily archived prior to cytometry.

The flow cytometer system of the present invention is useful for continuous monitoring for biological warfare contaminants in air or water. The flow cytometer system is typically provided on a microfluidic chip, and is comprised of a sheath flow device and an interrogation region. The sheath flow device is used to introduce the core and sheath streams into a microfluidic channel in such a way that the sheath stream completely surrounds the core sample stream, thus preventing fouling of the microfluidic channel where the top and bottom of the core sample stream would have touched the channel walls and completely focusing the stream within the interrogation region. Optionally, the sheath and core stream can be separated after the analysis so that each can be separately recaptured and the sheath fluid reused. The use of the microfluidic flow cytometer and sheath fluid recapture will significantly reduce the footprint of the monitoring system.

The optical interrogation region is comprised of at least one waveguide, which is composed of a photoresist material that is integrated onboard the microfluidic chip for delivery of excitation light at two different wavelengths and collection of signal for analysis of 3-color fluorescence emission and light scatter. Coded Luminex® beads provide the multiplexing capability.

On-chip optical analysis was performed on the core stream using a diode laser with pigtailed optical fibers to illuminate the core stream. Light scatter at 90° was measured to detect the passage of yeast cells through the illuminated region of the core. Signal tracings, representing the light scatter signal from five-fold serial dilutions of yeast cells, demonstrated that the light scatter signals were proportional to the concentration of cells in the flow stream.

The addition of optical elements measuring fluorescence to a flow cytometer on a chip is straightforward using methods and devices known in the art, such as optical fibers or polymer waveguides and light sources and filters of the appropriate wavelengths. The types of fluorescence analyses using dyes and labeled binding molecules that can be performed are described extensively in literature using commercial flow cytometers and are well known in the art. In general, the number of analytes that can be analyzed simultaneously is a function of the number of labels that can be excited and discriminated. However, one approach that enables the performance of highly multiplexed assays relies only on three-color discrimination. A commercially available version of this approach for flow cytometry uses coded beads.

Luminex coded beads are prepared so that two colors of fluorescence are emitted when the bead is excited using a red laser. The ratio of the two colors indicates the identity of the bead. If target is bound to the bead, that bead can be distinguished from beads with no target bound by the formation of a complex with another antibody labeled with a third fluorescent label (dye, quantum dot, fluorescent nanoparticle) excited using a green laser.

Recovery of the particles producing a positive signal is desirable in order to confirm that the positive result was indeed caused by the toxin or pathogen presumed present according to the results of the screening immunoassay. Analysis of a separate aliquot inevitably assumes that the composition of the tested and archived sample fractions is identical—which might be questionable for very low concentration of agent. Therefore a means for sorting can be included in the microflow cytometer device that can provide the ability to sort particles of interest into an on-chip collection chamber to reserve them for further analysis.

The core and sheath streams are first introduced to the same channel from a 'T' intersection so that they are flowing side-by-side. A series of grooves placed in the top and bottom of the channel then serve to completely wrap the sheath stream around the core. The sheath fluid becomes entrained by the grooves and travels above and below the core stream to completely surround it.

Example

A flow cytometer was made using soft lithography in a 3 mask process. The channels were assembled from two pieces that were mirror images of each other. To produce the template, a 35 micron layer of SU-8 was first spun onto a silicon wafer and exposed with the mask defining the 200 micron wide fluid channels. Then a second 30 microns layer was spun on and exposed with the second mask, defining the grooves. Finally a third mask was used to expose both layers and define the channels to hold the optical fibers.

When baked and developed, only the exposed portions of the SU-8 remained. This created a negative master of one half of the channel. The negative masters were then used to cast Sylgard-184 (Dow-Corning) into the two halves of the chip. When the two halves were aligned and brought together, the result was a 70 micron deep fluid channel with 30 micron deep grooves placed in the top and the bottom. The fiber channels were 130 micron deep because both layers of SU-8 were exposed. This was sufficient to accommodate the 130 micron OD optical fibers.

The chips have two inlets. The inlet and outlet ports were made in the bottom piece of PDMS with an 18-gauge needle. Fluidic connections to the chips were provided via a PMMA base made using a CNC mill. The base had a set of ports on the face that could be aligned with and pressed against ports of the chip. A set of internal channels connected these ports with short lengths of stainless steel tubing along the edge of the base. These could be used as friction connections to silicone tubing, which was connected to syringe pumps (Cole-Parmer, Vernon Hills, Ill.).

Chip assembly required careful alignment of the two halves. The presence of the fiber channels assisted with the alignment. As a first step, the bottom piece was placed on the base and the ports on the chip were aligned with the ports on the base. Then the fibers were positioned in the fiber channels. A single-mode fiber was used for illumination and a multimode fiber was used to collect the scattered light at 90 degrees. The base of each fiber was held in place with tape so that it would remain in the channel. A small amount of ethanol was then placed on the bottom piece and the top piece positioned on top. The ethanol prevented the immediate adhesion of the two pieces of PDMS. The two pieces "clicked" together and were aligned to within about 20 microns, due to the fibers locking into the fiber channels. A glass slide was then placed over the top piece and weak lateral pressures were applied until the two pieces were completely aligned. The chip was then left until the ethanol evaporated and the adhesion between the two PDMS pieces was fully developed. A small amount of Sylgard-184® was then applied to the end of each fiber channel and allowed to wick in around the fiber and form a complete seal.

Figure 15:
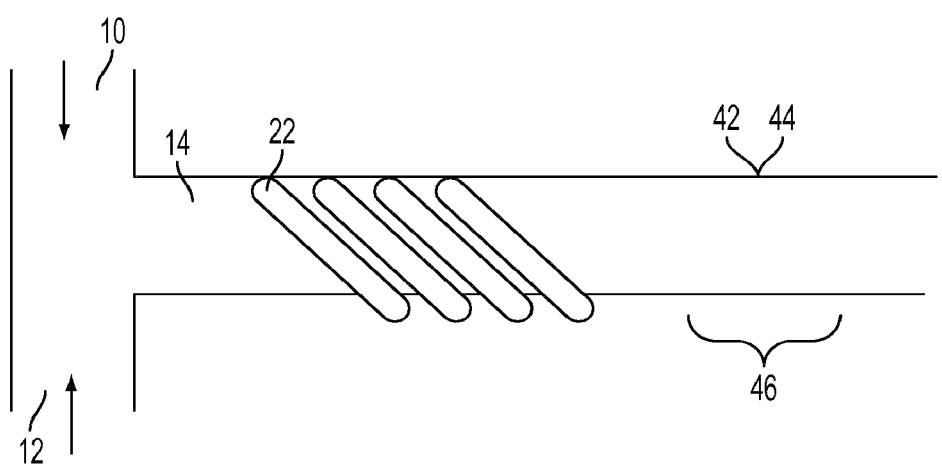
FIG. 15 is a flow cytometer device.

FIG. 15 shows the flow cytometer. The inlets 10, 12 are connected to the channel 14. The fluid transporting structures 22 wrap the sheath stream around the core stream, focusing the core stream in the interrogation region 46. Interrogation, for example, illumination, comes from a single mode fiber 42. Light was collected by a multimode fiber 44.

On-chip optical analysis was performed on the core stream using a diode laser with pigtailed optical fibers to illuminate the core stream. Light scatter at 90° was measured to detect the passage of yeast cells through the illuminated region of the core. A series of sample suspensions were made having concentrations of 222, 41.5, 7.44, 1.66, and 0.313 ppm of Yeast (Fleishmann's active dry) in phosphate buffered saline containing 0.01% Tween-20. The sample solutions were introduced into the cytometer. The volumetric flow rates of the sample and the sheath were the same.

Figure 16A:
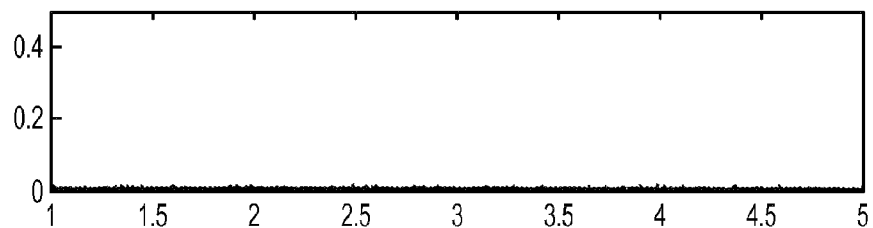
FIGS. 16(a)-16(e) show a series of traces of the light scatter resulting from the series in order of increasing concentration.
Figure 16B:
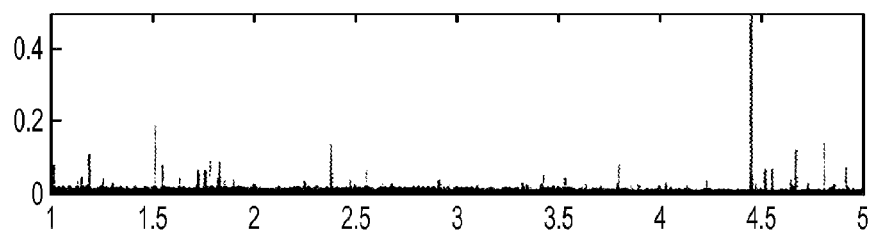
Figure 16C:
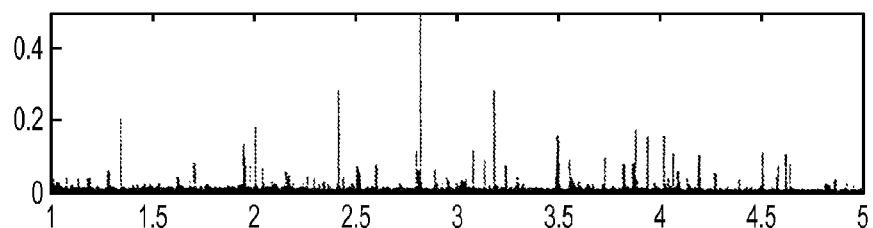
Figure 16D:
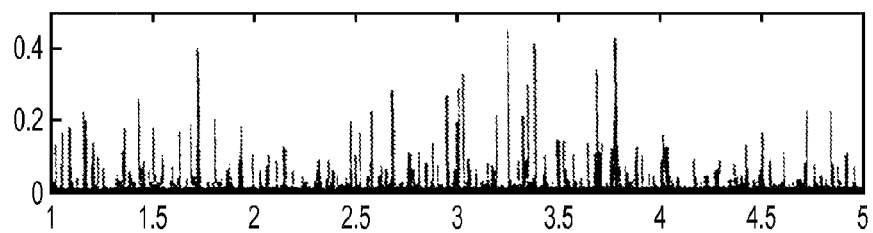
Figure 16E:
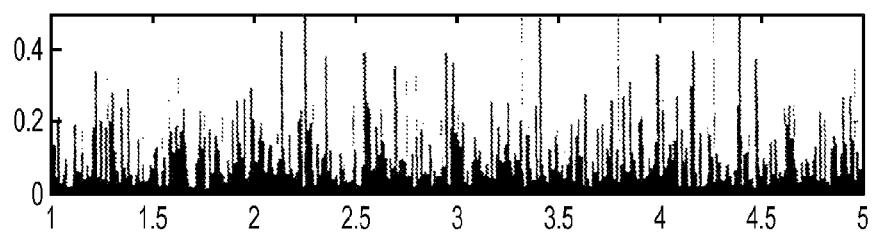

FIGS. 16(a)-16(e) show a series of traces of the light scatter resulting from the series in order of increasing concentration. As shown in the signal tracings, representing the light scatter signal from five-fold serial dilutions of yeast cells, the light scatter signals were proportional to the concentration of cells in the flow stream. The sample core was illuminated with the light from a helium-neon laser introduced via a single mode optical fiber. Scattered light was collected at 90 degrees using a multimode fiber and detected with a photomultiplier tube. FIG. 16a was a highly diluted sample, showing no cells during the 4-second sampling time. Each successive solution was roughly 5 times as concentrated as the previous solution. Each of the spikes seen in a plot represents the passage of a cell through the interrogation region. The number of spikes increases approximately 5-fold with the 5-fold increase in concentration.

The device and method of the present invention are also useful for the fabrication of materials. For example, the core stream can contain a polymerizable, condensable, cross-linkable or crystalizable material, which is extruded to the desired diameter using the sheath stream instead of a solid nozzle or channel. Since the flow cytometer device is small, inexpensive, and essentially operates as a passive component, many devices can be fabricated to perform in parallel, such as an array.

Materials from which structure can be fabricated include but are not limited to a wide variety of polymers including polystyrene, butyl rubber, polypropylene, polyacrylamide, polysiloxane, and polymethylmethyacrylate. Biological molecules can be ordered to self assemble into higher order structures; such molecules could include a wide variety of lipids, proteins, carbohydrates and oligonucleotides. Materials that form harder structures could be used including precursors of glassy materials such as sol gels, as discussed in Sousek et al., Polymers for Advanced Technologies, 2005, 16:257-261, incorporated herein in full by reference, or initiators for subsequent deposition of metals, calcium, and/or semiconductors. The fluids used can be aqueous or organic. Preferably, the core and sheath fluid are the same phase.

By varying the diameter of the core, tapered materials can be fabricated. Nonuniform or tapered geometries for waveguides can be generated. Controlling the relative rates of sheath and core flow during polymerization of filaments provides high precision, tapered structures with sub-micrometer diameter fluctuations, resulting in unique waveguiding properties.

The device and method is further useful in the synthesis of specialty polymeric filaments and tubes. Unlike standard extrusion technologies, filaments with continuously varying diameter can be created. Filaments made in this way can be expected to have increased elasticity over extruded filaments because of the native entropy of the polymer chains. The exact design may also be altered to change the cross-sectional shape of the resulting polymer strand.

By configuring the grooves or ridges used to transport the sheath stream, non-round shapes can also be obtained. In addition to varying the rate of flow to change the diameter of the core, the core fluid can be pulsed instead of flowed continually to stop and start the core stream to form "particles" or "packets" of core fluid. Once the desired size and shape are obtained, the material in the core is polymerized, condensed, cross-linked, or crystallized chemically, optically or by other means known in the art. Due to the geometry of the system, this type of synthesis can be conducted in continuous manner rather than in batches. Moreover, the geometry of the system is particularly amenable to the production of high-aspect-ratio structures and filaments that are especially difficult to produce in quantity.

Shapes that can be fabricated in this method include, but are not limited to, ovals, ribbons, rods, wires, tubes and filaments. Using the grooves or ridges on the top and bottom of the channel can be specifically designed to produce the desired shape. The grooves or ridges do not have to be straight but can have a variety of configurations as long as they channel the fluid around the core. They can be curved, in the shape of chevrons, angled like "check marks," or in a variety of other shapes in order to influence the shape of the resultant core fluid. The addition of more inputs and grooves further downstream can be used to expand the repertoire of shapes that can be fabricated.

More complex shapes that can be designed and fabricated using grooves or ridges include hollow cylinders, filled "sausages," coated particles, rods with alternating composition, also known as "nano bar codes". Structures with longitudinal or lateral density or chemical gradients can be fabricated by introducing gradients into one of the flow streams (longitudinal) or by allowing a reactant to diffuse in or out of the core while it is in contact with the sheath stream (lateral).

Figure 17:
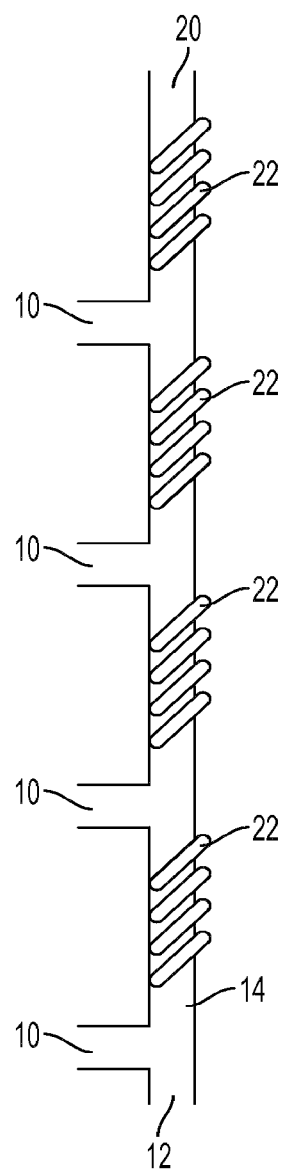
FIG. 17 is a view of one example of a sheath flow device.
Figure 18:
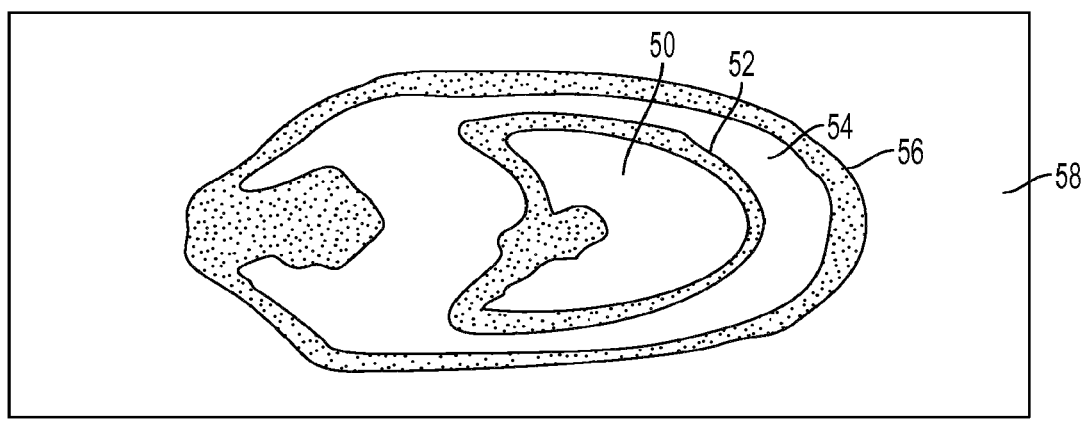
FIG. 18 is a tube within a tube made by the sheath flow device.

FIG. 17 shows a sheath flow device capable of creating a hollow tubes within a hollow tube. A sheath input 10 and a core input 14 are connected to a channel 14 having a series of fluid transporting structures 22. A series of successive sheath inputs 10 are provided downstream towards the outlet 20. Each successive sheath input 10 creates a new sheath around all the previously sheathed materials. FIG. 18 shows a hollow tube within a hollow tube that was made by using the device of FIG. 17 by alternately introducing input streams and ensheathing the structures. Core stream 50 is surrounded by successive sheath streams 52, 54, 56 58. Sheath streams 52 and 56 were labeled with a fluorescent dye for contrast.

Typically, the sheath stream is sufficient to move the polymerized material to the output of the channel. For some materials, however, as the extruded material polymerizes and its viscosity increases from its unpolymerized value to infinity, the dynamics of the flow profile within the channel may change to the point that feed matching is required to control the fluid velocity and effectively remove the polymerized material. There are several options available to do feed-matching. In an elastomeric chip, the fluid velocity is controlled by compressing the channel to cause the fluid to accelerate. Additionally, rollers may be placed at the exit of the chip so that they impinge on the rod and control the linear exit velocity of the polymerized rod.

Generally, the core contains a polymerizable material and is extruded to the desired diameter using the sheath stream instead of a solid nozzle or channel. Once the desired shape is obtained, the core material is polymerized chemically or optically. Due to the geometry of the system, production can be in continuous instead of in batch mode. Moreover, the geometry of the system is particularly amenable to the production of high aspect ratio structures and filaments which are especially difficult to produce in quantity. Since the fabrication device is small, inexpensive, and essentially operates as a passive component, many devices can be fabricated to perform in parallel, such as an array.

Obviously, many modifications and variations of the present invention are possible in light of the above teachings. It is therefore to be understood that, within the scope of the appended claims, the invention may be practiced otherwise than as specifically described.

What is claimed is:

1. A method for extruding materials, comprising:
providing a channel having a proximal end and a distal end, said channel having opposed facing top and bottom surfaces, said channel having at least one first fluid transporting structure across said channel located on said top surface and at least one second fluid transporting structure across said channel located on said bottom surface, said first and second fluid transporting structures being located between said proximal and said distal end and on said opposing faces surfaces, facing one another across the channel;
introducing a sheath stream and a core stream at said proximal end of said channel, said sheath and core streams flowing down said channel side by side towards said distal end, wherein said fluid transporting structures transport said sheath stream across said top and bottom surfaces of said channel to surround said core stream, wherein said sheath stream controls the size and shape of said core stream, wherein said core stream is extruded from said distal end of said channel.

2. The method of claim 1, wherein the core stream comprises a polymerizable, condensable, cross-linkable or crystalizable material.

3. The method of claim 1, further comprising introducing at least a second sheath stream to create an output of multiple concentric layered streams.

* * * * *